(No Model.) 2 Sheets—Sheet 1.

C. FISCHER.
BED PAN.

No. 535,241. Patented Mar. 5, 1895.

Witnesses-
H. M. Corwin
W. B. Corwin

Inventor-
Carl Fischer
by his Attorneys
W. Bakewell & Sons

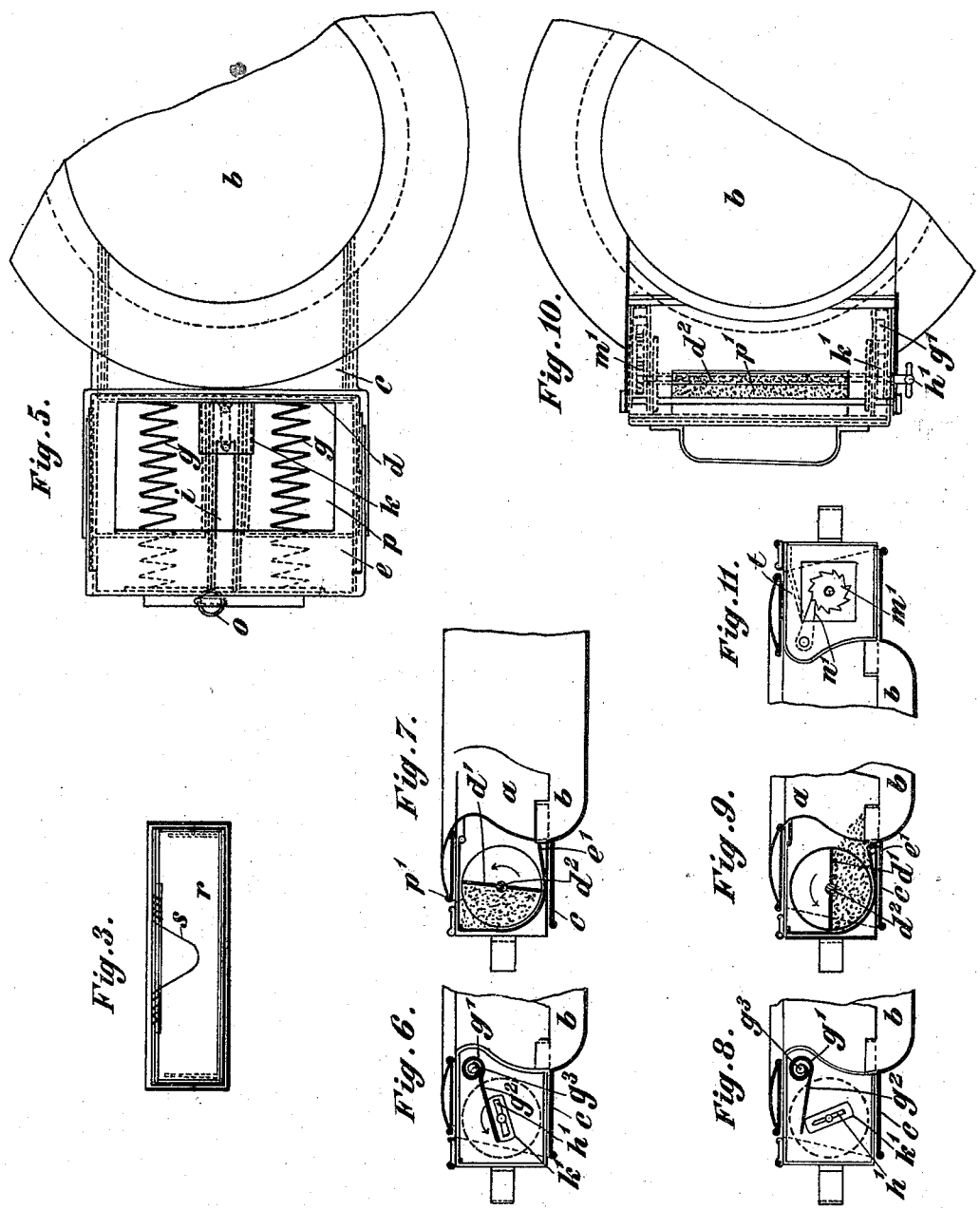

UNITED STATES PATENT OFFICE.

CARL FISCHER, OF BREMEN, GERMANY.

BED-PAN.

SPECIFICATION forming part of Letters Patent No. 535,241, dated March 5, 1895.

Application filed October 9, 1893. Serial No. 487,575. (No model.) Patented in Germany March 6, 1892, No. 66,419.

*To all whom it may concern:*

Be it known that I, CARL FISCHER, of Bremen, German Empire, have invented a new and useful Bed-Pan, (for which I have obtained a German patent, No. 66,419, dated March 6, 1892,) of which the following is a specification, reference being had therein to the accompanying drawings.

The distinguishing feature of this bed-seat is that an arrangement is placed before an opening in the side of the bed-seat whereby a disinfectant can be injected into the interior of the bed-seat.

Figure 1:
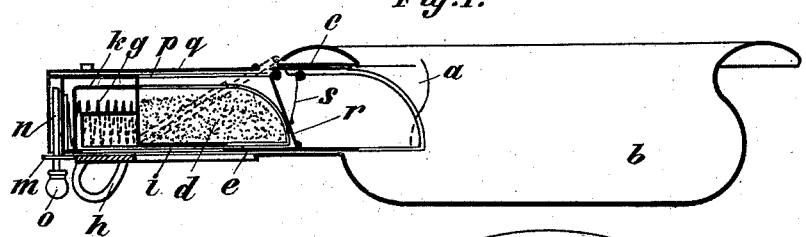
Figure 2:
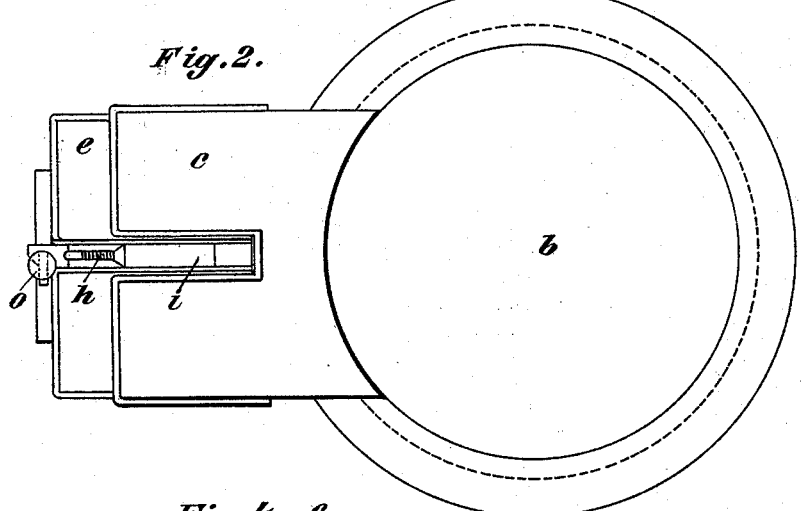
Figure 4:
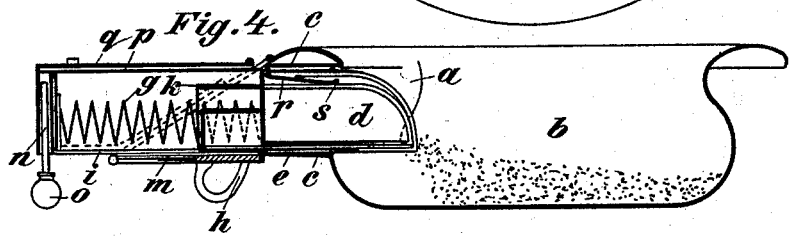

Figure 1 on the drawings is a longitudinal section of such a bed-seat, and Fig. 2 is the same viewed from below. Fig. 3 is a cross-section of the injecting arrangement. Fig. 4 is a longitudinal section of a bed-seat in a position in which use has been made of the injecting arrangement. Fig. 5 is a top plan view of Fig. 4 with the lid removed. Figs. 6 to 11 show a different form of the injecting apparatus.

Before the opening $a$ in the side-wall of the bed-seat or bed-pan $b$, a case $c$ is fixed, which serves to hold the injecting apparatus which can be drawn out. This consists of a scoop $d$ running in the case $e$. The scoop $d$ has a handle $h$ which projects through a slit $i$ in the floor of the case $e$. Behind the scoop a shoulder piece $k$ is soldered on in the middle between the springs $g$; the handle $h$ and a catch $m$ being secured to this shoulder piece. Behind the case $e$ there is a chamber in which there is a pawl or trigger $n$ which projects downward and outward and is fitted with a knob $o$. The pawl $n$ is controlled by a spring which is intended to force the pawl into the catch $m$ when the scoop $d$ is drawn back thus retaining the scoop in its position as shown in Fig. 1. At the top of the case $e$ is an opening $p$ which can be closed by the sliding-lid $q$. When drawn back the scoop $d$ comes under the opening $p$ through which, on sliding back the lid $q$, the scoop can be filled with disinfectant. To facilitate handling the bed-seat, when filling is completed, and to avoid spilling a trap $r$, which hangs on hinges in the case $e$, falls down before the scoop. This trap is held *in situ* (Fig. 1) by a small spring $s$, Fig. 3. If the pawl $n$ is pushed aside, the catch $m$ is released and the scoop is impelled forward by the pressure of the springs $g$. The trap $r$ is turned upward by the scoop itself and the contents of the scoop are injected into the bed-seat $b$, as shown in Fig. 4, the lid $q$ being removed in Fig. 5.

In the form of Figs. 6 to 11 the injection of the disinfectant is effected by the aid of a revolving plate $d'$. In a drum $e'$—which, like the case $e$, is removably fitted in a case firmly fixed to the bed-seat, is a revolving-shaft $d''$ carrying the revolving-plate $d'$. On one of the arms of the shaft $d''$, which protrude from the drum, is a flat cam $k'$ against which the flat end $g''$ of the spiral spring $g'$ presses. The spring $g'$ is fixed at $g'''$. By the action of the spring $g'$ the cam $k'$ is forced to take the position shown in Fig. 6. If it is turned at an angle of more than ninety degrees (Fig. 8), the spring is stretched thus completing the half-turn of the cam with a jerk. The position of the cam $k'$, as shown in Fig. 6 corresponds to that of the revolving plate $d'$ as shown in Fig. 7. In this position, as also shown in the same illustration, the apparatus can be filled with disinfectant. If, by means of the handle $h'$, the revolving-slide has been turned in the direction of the arrow at an angle of more than ninety degrees, the position shown in Fig. 9 is obtained, whereby the cam $k'$ is completely turned over by the spring $g'$ and the disinfectant is thrown into the bed-seat. At the opposite end of the shaft $d''$ is a cog-wheel $m'$ the teeth of which are caught by a pawl $n'$. The spring $t$ holds the pawl $n'$ pressed against the cog-wheel. This check-action prevents the revolving-slide $d'$ from being turned contrary to the direction indicated by the arrow thus obviating the possibility, owing to clumsy handling, of the disinfectant being thrown backward out of the injection inlet $p'$ instead of into the interior of the bed-seat.

From the description of the two varieties, given above for the sake of example, it may easily be seen that the arrangement admits of still other modifications without departing from my invention.

What I claim, and desire to secure by Letters Patent of the United States, is—

A bed-pan having an injector adapted to discharge a disinfectant thereinto, a trap situate in front of the injector and adapted to prevent premature spilling of the disinfectant and a yielding spring arranged to hold said trap in place; substantially as described.

In witness whereof I have hereunto set my hand in presence of two witnesses.

CARL FISCHER.

Witnesses:
M. SCHRAGENHEINY,
H. M. STARKLOFF.